Feb. 5, 1924.
J. J. SULLIVAN
WINDSHIELD WIPER
Filed Jan. 14, 1922
1,482,448
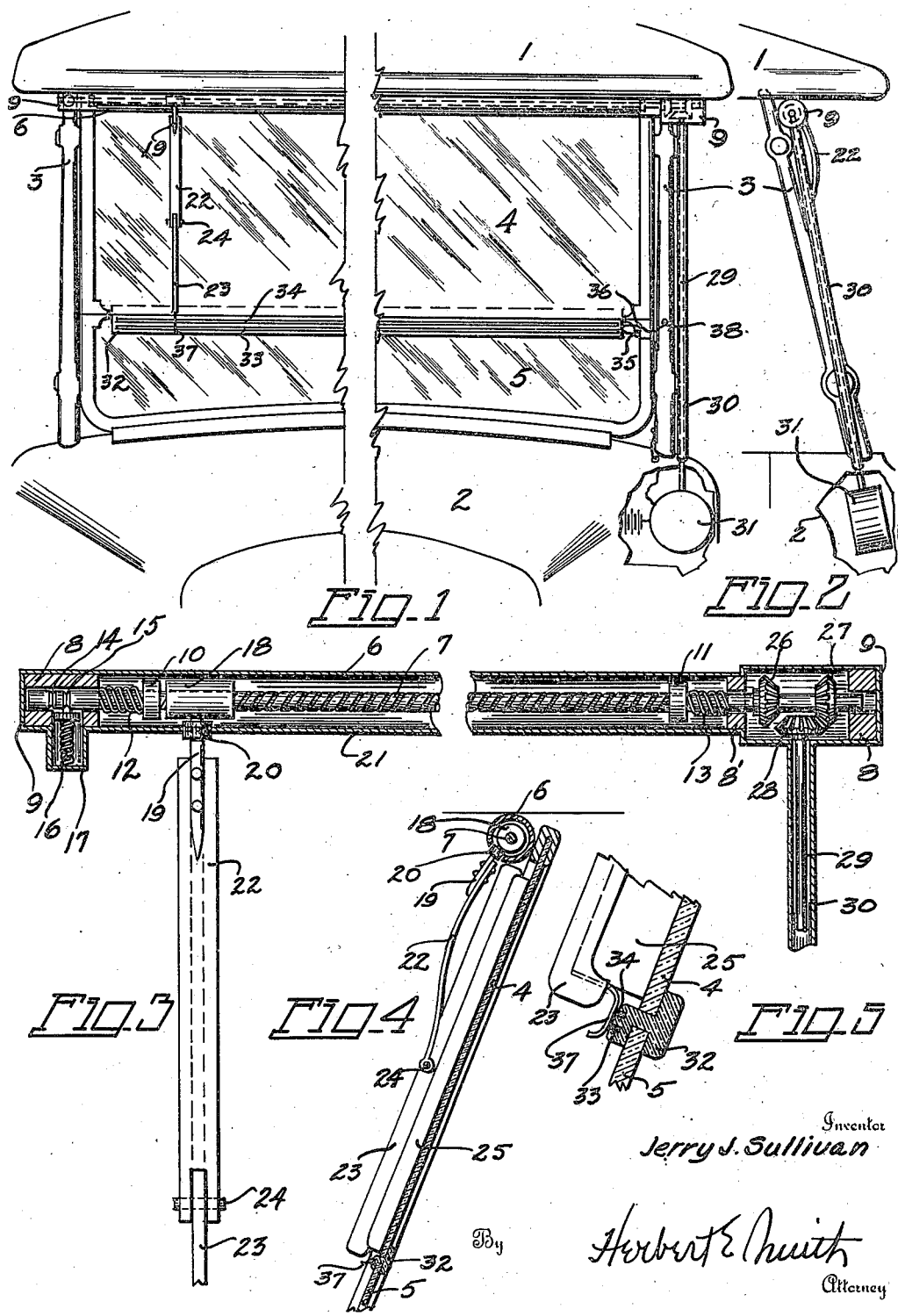
Inventor
Jerry J. Sullivan
By
Herbert E. Smith
Attorney Patented Feb. 5, 1924.

1,482,448

UNITED STATES PATENT OFFICE.

JERRY J. SULLIVAN, OF SPOKANE, WASHINGTON.

WINDSHIELD WIPER.

Application filed January 14, 1922. Serial No. 529,135.

*To all whom it may concern:*

Be it known that I, JERRY J. SULLIVAN, a citizen of the United States, residing at Spokane, in Spokane County and State of Washington, have invented certain new and useful Improvements in Windshield Wipers, of which the following is a specification.

My present invention relates to improvements in windshield wipers involving the utilization of a motor-operated squeegee adapted to be reciprocated, transversely, across the face of the windshield for cleaning and removing moisture therefrom, in order that the driver of the automobile or other vehicle to which the windshield is attached, may have at all times a clear vision of the roadway being travelled. While I have illustrated the device in the drawings in connection with the windshield of a motor vehicle, and shall hereinafter refer to such use, it will be apparent that the utility of the device of my invention is not limited to this exemplification, and it will be understood that the subject matter of the invention is applicable in other relations. In the present instance the wiping device is operated by an electric motor carried by the vehicle and receiving power generated from the vehicle motor, and the operation of the motor is controlled by electrical connections including a starting switch of the make and break type.

The invention consists in certain novel combinations and arrangements of parts whereby the squeegee is reciprocated and driven as will be hereinafter more fully described and claimed, and in certain features of construction which provides for facile actuation and efficient operation of the device while in use.

In the accompanying drawings I have illustrated one complete example of the physical embodiment of my invention wherein the parts are combined and arranged according to the best mode I have thus far devised for the practical application of the principles of my invention.

Figure 1 is a view in elevation from the front of an automobile with parts omitted showing the adaptation thereto of the device of my invention.

Figure 2 is an edge view of the parts in Figure 1 showing the windshield and relation of the wiper.

Figure 3 is an enlarged, detail view showing the operating parts of my device, and showing the housing or casing therefor in section.

Figure 4 is a detail sectional view through the windshield showing the squeegee in its relation thereto.

Figure 5 is an enlarged sectional view at the joint between the upper and lower panels of the windshield illustrating an electrical connection of the control circuit for the motor.

In the form of the invention as illustrated in the drawings I have indicated the top 1 of an automobile together with the cowl 2 and supporting side bars 3 for the top in which the windshield is supported, the upper panel being indicated as 4 and the lower panel 5. These parts are of usual or standard construction, and it will be understood that the device is designed for use in connection with the outer face of the upper panel 4 of the windshield.

In applying the device of my invention for use in connection with the windshield of an automobile, I utilize a tubular casing 6, preferably of metal and cylindrical in form, and located as illustrated directly beneath the top 1 of the vehicle. Suitable supports or attaching means are provided for the tubular casing, which extends transversely of the vehicle, and the casing may be supported from the frame bars 3 of the windshield or from the automobile top 1.

Within the casing 6 is a screw bar 7 suitably journaled to revolve in bearings 8, 8 for its ends and an intermediate bearing 8', by means of which bearings the screw bar is operatively supported, the two end bearings being enclosed within the end housings 9 of the casing 6, whereby the screw-bar or screw-shaft is shielded and protected.

Near the ends of the screw shaft, and beyond the threads on the shaft are provided a pair of loose slide collars 10 and 11, which are permitted to have a limited movement on the smooth shaft beyond the ends of the threads thereof, and these respective collars are urged inwardly toward the center of the shaft by the respective springs 12 and 13 coiled about the shaft and interposed between the collars and an end bearing 8 in one instance and the intermediate bearing 8' at the right of Figure 3. The screw shaft is shiftable longitudinally in its bearings and for temporarily holding it in position I utilize two annular grooves 14 and 15 near one end within the housing 9 with which a spring detent 16 co-acts. The spring detent is disposed at right angles to the shaft, in a housing 17 forming a radial extension of the bearing-housing 9, and it will be understood that the spring pressed detent is engaged at all times with either one or the other of the annular grooves 14 and 15 of the screw shaft.

The shaft is shifted longitudinally and its rotary motion reversed through the instrumentality of a traveling nut 18 on the screw shaft which co-acts alternately with the collars 10 and 11 as the shaft is revolved, as will be described.

A shank or stem 19 is projected radially from the traveling nut and provided with an anti-friction roller 20 that is guided to run in the longitudinally extending slot 21 in the lower portion of the tubular casing 6, as the nut travels on the revolving screw shaft. Attached to the shank 19 is a spring or resilient arm 22 to which a holder 23 is pivoted at 24, and this holder carries the rubber edge strip 25, the whole forming the squeegee. The squeegee as shown is disposed vertically in front of the panel 4 of the windshield with the rubber strip in contact with the panel, while the pivoted resilient arm 22 rigidly attached to the shank 19 at one end, because of its elasticity, holds the rubber strip in frictional contact with the panel throughout its height.

Thus it will be apparent that as the screw shaft is revolved, the non-rotatable nut 18 will be caused to move longitudinally on the screw shaft, carrying with it the wiper or squeegee which is passed across the face of the panel 4 in close contact therewith to wipe off moisture or otherwise clean the glass panel of the windshield. As the traveling nut approaches the end of its travel in one direction it encounters an abutment or collar, as 11. The spring 13 forms a resilient obstruction against movement of the collar, but gradually increases its resistance against the forward movement of the nut until the movement of the nut is imparted to the screw shaft. This increased resistance or cushioning effect of the spring results in a gradual slowing up of movement of the nut and wiper to prevent jerks, and when the spring is sufficiently compressed the shaft is shifted longitudinally. The pressure exerted on the shaft causes the spring detent 16 to be retracted and shifted from groove 15 to groove 14 in the shaft and after pressure is withdrawn the detent in groove 14 holds the shaft in temporary position. The reversal of this movement takes place at the left end of the shaft in Fig. 3 when the nut coacts with collar 10.

For reversing the revolutions of the screw shaft and the reciprocating movement of the traveling nut I employ a pair of reversing gears 26 and 27 in the form of bevel gears spaced apart and tight on the shaft within the housing 9 at the right end of the shaft in Fig. 3. These gears are selectively driven from the driving bevel pinion 28 within the housing 9 and fixed to revolve with the driving shaft 29, in the housing 30, which latter shaft is operated by the electrically operated motor 31. Thus it will be apparent that as the screw shaft is revolved by the train of gears 28—27 the nut will be caused to travel to the right and finally shift the screw shaft to the right, disengaging the gears 28—27 and engaging the gears 26—28, which engagement causes reverse revolutions of the screw shaft and effects the return or reverse movement of the traveling nut and its squeegee. The continuous rotation of the driving shaft and its driving pinion results in successive reversals of the revolutions of the screw shaft and consequent reciprocation of the traveling nut. The motor is preferably connected to the magneto of the automobile for its electric currents, and may be provided with a control circuit, including a control switch, within the power circuit that operates the motor, and this control switch may be located at convenient and accessible position for manual use.

An automatic, electrical control is indicated in the drawings for operating the motor. In the rubber binding strip 32 or weather strip fixed to the lower panel 5 and against which the upper panel contacts I embed a pair of conductors or metallic conducting strips 33 and 34, that are connected by wires 35 and 36 (Fig. 1) to form a control circuit for the motor. A metallic contact plate 37 carried by the holder 23 of the squeegee is adapted to bridge the space between these strips and contact with them to close the automatic control circuit, one of the wires 36 being grounded at 38 on the side bar 3 and the other connected to the motor 31. These conductors are spaced apart in order that should rainwater close the gap between them and complete the otherwise closed circuit, the automatic control circuit will start the motor and operate the squeegee, and the bridge member or contact plate 37 after reaching the conductors will continue to slide over them insuring a closed circuit for the automatic control. The squeegee may thus be given a single reciprocating movement and after the contact plate cleans or wipes off the moisture between the two conducting strips, and passes out of sliding contact with them, the control circuit will automatically be broken and the motor circuit also be broken, thus stopping the motor. The control circuit may of course be maintained in closed position in order to continue the reciprocation of the squeegee for an indefinite period, as during a heavy rain and it is necessary to continuously wipe the windshield panel in order to keep it clear for proper vision.

Changes and alterations may be made in the invention as illustrated, within the scope of my appended claims, without departing from the spirit of my invention, and such changes are of course contemplated in different adaptations of the subject matter of the invention.

Having thus fully described my invention, what I claim as new and desire to secure by Letters Patent is—

1. The combination in a windshield cleaner with a slotted tubular casing and a reciprocable member therein, of a resilient arm on said member, a roller on said arm guided in the slotted tubular casing, and a squeegee pivoted on the free end of said arm.

2. In a windshield cleaner the combination with an electric motor, a reciprocable wiper and operating means between the motor and wiper, of co-acting electrical conductors on the windshield and wiper for automatically energizing the motor when rain falls on the device.

3. In a windshield cleaner the combination with an electric motor, a reciprocable wiper and operating means between the motor and wiper, of a pair of spaced electrical conductor plates on the windshield, and a complementary contact plate on the wiper for automatically energizing the motor when rain falls on the device.

In testimony whereof I affix my signature.

JERRY J. SULLIVAN.